(12) United States Patent
Bloomfield et al.

(10) Patent No.: US 12,080,533 B2
(45) Date of Patent: Sep. 3, 2024

(54) METHOD FOR REAL TIME ENCODING OF SCANNING SWATH DATA AND PROBABILISTIC FRAMEWORK FOR PRECURSOR INFERENCE

(71) Applicant: DH TECHNOLOGIES DEVELOPMENT PTE. LTD., Singapore (SG)

(72) Inventors: Nic G. Bloomfield, Newmarket (CA); Gordana Ivosev, Etobicoke (CA)

(73) Assignee: DH Technologies Development Pte. Ltd., Singapore (SG)

( * ) Notice: Subject to any disclaimer, the term of this patent is extended or adjusted under 35 U.S.C. 154(b) by 168 days.

(21) Appl. No.: 17/593,142

(22) PCT Filed: May 29, 2020

(86) PCT No.: PCT/IB2020/055138
§ 371 (c)(1),
(2) Date: Sep. 10, 2021

(87) PCT Pub. No.: WO2020/240506
PCT Pub. Date: Dec. 3, 2020

(65) Prior Publication Data
US 2022/0189754 A1 Jun. 16, 2022

Related U.S. Application Data

(60) Provisional application No. 62/855,242, filed on May 31, 2019.

(51) Int. Cl.
H01J 49/00 (2006.01)
G06F 17/16 (2006.01)
G06F 17/17 (2006.01)

(52) U.S. Cl.
CPC .......... *H01J 49/0036* (2013.01); *G06F 17/16* (2013.01); *G06F 17/17* (2013.01); *H01J 49/0045* (2013.01)

(58) Field of Classification Search
CPC ... H01J 49/0036; H01J 49/0045; G06F 17/16; G01F 17/17
(Continued)

(56) References Cited

U.S. PATENT DOCUMENTS 4,283,626 A 8/1981 Siegel
4,472,631 A 9/1984 Enke et al.
(Continued)

FOREIGN PATENT DOCUMENTS

CN 109526237 A 3/2019
GB 2438488 11/2007
(Continued)

OTHER PUBLICATIONS

International Search Report and Written Opinion for PCT/IB2020/055138, dated Aug. 28, 2020.
(Continued)

*Primary Examiner* — Nicole M Ippolito
(74) *Attorney, Agent, or Firm* — Merchant & Gould P.C.

(57) ABSTRACT

A precursor ion transmission window is moved in overlapping steps across a precursor ion mass range. The precursor ions transmitted at each overlapping step by the mass filter are fragmented or transmitted. Intensities or counts are detected for each of the one or more resulting product ions or precursor ions for each overlapping window that form mass spectrum data for each overlapping window. Each unique product ion detected is encoded in real-time during data acquisition. This encoding includes sums of counts or intensities of each unique ion detected the overlapping windows and positions of the windows associated with each
(Continued)

sum. The encoding for each unique ion is stored in a memory device rather than the mass spectral data. A deblurring algorithm or numerical method is used to determine a precursor ion of each unique ion from the encoded data.

20 Claims, 11 Drawing Sheets

(58) Field of Classification Search
USPC ............................ 250/281, 4, 282, 283, 288
See application file for complete search history.

(56) References Cited

U.S. PATENT DOCUMENTS

| | | | |
|---|---|---|---|
| 4,507,555 | A | 3/1985 | Chang |
| 6,373,052 | B1 | 4/2002 | Hoyes et al. |
| 6,800,846 | B2 | 10/2004 | Bateman et al. |
| 6,983,213 | B2 | 1/2006 | Wang |
| 7,348,553 | B2 | 3/2008 | Wang et al. |
| 7,365,309 | B2 | 4/2008 | Denny et al. |
| 7,534,622 | B2 | 5/2009 | Hunt et al. |
| 7,952,066 | B2 | 5/2011 | Pappin et al. |
| 7,982,181 | B1 | 7/2011 | Senko |
| 8,237,106 | B2 | 8/2012 | Castro-Perez et al. |
| 8,766,172 | B2 | 7/2014 | Gorenstein et al. |
| 8,809,770 | B2 | 8/2014 | Bonner et al. |
| 8,809,772 | B2 | 8/2014 | Bonner et al. |
| 8,822,916 | B2 | 9/2014 | Guna |
| 9,147,562 | B2 | 9/2015 | Bonner et al. |
| 9,202,677 | B2 | 12/2015 | Tate et al. |
| 9,269,555 | B2 | 2/2016 | Tate et al. |
| 9,343,282 | B2 | 5/2016 | Tate et al. |
| 9,377,469 | B2 | 6/2016 | Louette et al. |
| 9,460,900 | B2 | 10/2016 | Bonner et al. |
| 9,466,471 | B2 | 10/2016 | Tate et al. |
| 9,472,387 | B2 | 10/2016 | Bloomfield et al. |
| 9,583,323 | B2 | 2/2017 | Tate et al. |
| 9,842,731 | B2 | 12/2017 | Bonner et al. |
| 9,911,585 | B1 | 3/2018 | Zabrouskov |
| 10,068,753 | B2 | 9/2018 | Bloomfield et al. |
| 10,074,527 | B2 | 9/2018 | Bonner et al. |
| 10,074,528 | B2 | 9/2018 | Makarov et al. |
| 10,651,019 | B2 | 5/2020 | Ivosev et al. |
| 11,069,517 | B2 | 7/2021 | Tate |
| 11,340,192 | B1 * | 5/2022 | Beyer .................. G01N 27/622 |
| 2005/0131647 | A1 | 6/2005 | Maroto |
| 2005/0133712 | A1 | 6/2005 | Belov et al. |
| 2005/0288872 | A1 | 12/2005 | Old |
| 2006/0169883 | A1 | 8/2006 | Wang et al. |
| 2006/0243900 | A1 | 11/2006 | Overney et al. |
| 2006/0255258 | A1 * | 11/2006 | Wang ................. G01N 30/8665 250/282 |
| 2006/0287834 | A1 | 12/2006 | Kearney et al. |
| 2007/0288174 | A1 | 12/2007 | Young et al. |
| 2008/0135746 | A1 | 6/2008 | Wildgoose et al. |
| 2009/0090857 | A1 | 4/2009 | Sigman et al. |
| 2009/0121126 | A1 | 5/2009 | Collings et al. |
| 2009/0194685 | A1 | 8/2009 | Corr et al. |
| 2009/0194688 | A1 | 8/2009 | Bateman et al. |
| 2009/0236516 | A1 | 9/2009 | Kishi et al. |
| 2010/0028076 | A1 | 2/2010 | Balsells |
| 2010/0213368 | A1 | 8/2010 | Wang et al. |
| 2010/0280764 | A1 | 11/2010 | Thomson et al. |
| 2010/0286927 | A1 | 11/2010 | Horn et al. |
| 2010/0301205 | A1 | 12/2010 | Thomson |
| 2011/0127419 | A1 | 6/2011 | Thomson et al. |
| 2011/0204218 | A1 | 8/2011 | Hager et al. |
| 2012/0049058 | A1 | 3/2012 | Grothe, Jr. |
| 2012/0122077 | A1 | 5/2012 | Hughes et al. |
| 2012/0158318 | A1 | 6/2012 | Wright |
| 2013/0153761 | A1 | 6/2013 | Bonner et al. |
| 2013/0171459 | A1 | 7/2013 | Wang et al. |
| 2013/0206979 | A1 | 8/2013 | Bonner et al. |
| 2013/0228678 | A1 | 9/2013 | Savitski et al. |
| 2013/0240723 | A1 | 9/2013 | Bonner et al. |
| 2013/0289894 | A1 | 10/2013 | Cox et al. |
| 2014/0158881 | A1 | 6/2014 | Cooper |
| 2014/0239170 | A1 | 8/2014 | Okumura |
| 2014/0252218 | A1 | 9/2014 | Wright et al. |
| 2014/0297201 | A1 | 10/2014 | Knorr et al. |
| 2014/0332681 | A1 | 11/2014 | Tate et al. |
| 2014/0346341 | A1 | 11/2014 | Giles et al. |
| 2015/0025813 | A1 | 1/2015 | Collings |
| 2015/0097113 | A1 | 4/2015 | Campbell et al. |
| 2015/0102219 | A1 | 4/2015 | Yamamoto |
| 2015/0129757 | A1 | 5/2015 | Bonner et al. |
| 2015/0136968 | A1 | 5/2015 | Tate et al. |
| 2015/0144778 | A1 | 5/2015 | Bonner et al. |
| 2015/0162175 | A1 | 6/2015 | Wright |
| 2015/0340216 | A1 | 11/2015 | Kwiecien et al. |
| 2016/0025691 | A1 | 1/2016 | Taneda |
| 2016/0032933 | A1 | 2/2016 | Simonsen |
| 2016/0086783 | A1 | 3/2016 | Cox et al. |
| 2016/0109424 | A1 | 4/2016 | Johansen |
| 2016/0217988 | A1 | 7/2016 | Bloomfield et al. |
| 2016/0231295 | A1 | 8/2016 | Tate et al. |
| 2016/0233077 | A1 | 8/2016 | Hager et al. |
| 2016/0268111 | A1 | 9/2016 | Bloomfield et al. |
| 2016/0329197 | A1 | 11/2016 | Yamaguchi |
| 2018/0166265 | A1 | 6/2018 | Geromanos et al. |
| 2018/0240658 | A1 | 8/2018 | Cox et al. |
| 2019/0228957 | A1 | 7/2019 | Ivosev et al. |

FOREIGN PATENT DOCUMENTS

| | | |
|---|---|---|
| JP | 2006-093160 | 4/2006 |
| JP | 2007-309661 | 11/2007 |
| JP | 2009-158106 | 7/2009 |
| WO | 2007/129107 | 11/2007 |
| WO | 2012/090046 | 7/2012 |
| WO | 2013/044401 | 4/2013 |
| WO | 2013/098609 | 7/2013 |
| WO | 2013/098618 | 7/2013 |
| WO | 2013/171459 | 11/2013 |
| WO | 2013/171556 | 11/2013 |
| WO | 2014/076529 | 5/2014 |
| WO | 2014/195783 | 12/2014 |
| WO | 2014/195785 | 12/2014 |
| WO | 2015/056066 | 4/2015 |
| WO | 2016/012506 | 1/2016 |
| WO | 2016/046513 | 3/2016 |
| WO | 2015/107642 | 3/2017 |
| WO | 2020/240506 | 12/2020 |
| WO | 2023/026136 | 3/2023 |

OTHER PUBLICATIONS

European Extended Search Report in Application 20814729.8, mailed May 30, 2023, 8 pages.
PCT International Preliminary Report on Patentability in Application PCT/IB2020/055138, mailed Dec. 9, 2021, 6 pages.
PCT International Search Report in PCT Application for PCT/IB2017/053982, mailed Oct. 26, 2017, 3 pages.
PCT International Search Report in PCT Application PCT/IB2013/000724, mailed Aug. 28, 2013, 3 pages.
PCT International Search Report in PCT Application PCT/IB2014/002036, mailed Jan. 26, 2015, 3 pages.
PCT International Search Report in PCT Application PCT/IB2014/002038, mailed Jan. 28, 2015, 3 pages.
PCT International Search Report in PCT Application PCT/IB2016/050483, mailed May 18, 2016, 3 pages.
PCT International Search Report in PCT Application PCT/IB2016/054776, mailed Dec. 1, 2016, 3 pages.
PCT International Search Report in PCT Application PCT/IB2016/054867, mailed Dec. 28, 2016, 3 pages.
PCT International Search Report in PCT Application PCT/IB2017/054384, mailed Nov. 9, 2017, 3 pages.
PCT International Search Report in PCT Application PCT/IB2018/050626, mailed May 11, 2018, 4 pages.
Gillet, Ludovic et al., "Targeted Data Extraction of the MS/MS Spectra Generated by Data-Independent Acquisition: A New Con-

(56) References Cited

OTHER PUBLICATIONS cept for Consistent and Accurate Proteome Analysis", Molecular and Cellular Proteomics 11.6, Jun. 1, 2012, 17 pages.

Hopfgartner, Gerard et al., "High-Resolution Mass Spectrometry for Integrated Qualitative and Quantitative Analysis of Pharmaceuticals in Biological Matrices", Analytical and Bioanalytical Chemistry, vol. 402, Issue 8, Dec. 28, 2011, pp. 2587-2596.

Mullard, Graham et al., " A New Strategy for MS/MS Data Acquisition Applying Multiple Data Dependent Experiments on Orbitrap Mass Spectrometers in Non—Targeted Metabolomic Applications," Metabolomics, Jan. 14, 2015, vol. 11, No. 5, pp. 1068-1080.

Veneble et al., "Automated Approach for Quantitative Analysis of Complex Peptide Mixtures from Tandem Mass Spectra", Nature Methods, vol. 1, No. 1, 2004, DOI 10.1038/NMETH705, 7 pages.

Watson and Sparkman: "Introduction to Mass Spectrometry," 2007, Wiley and Sons, West Sussex, England, XP002671264, ISBN: 978-0-470 51634-8, Section A, Data Dependent Acquisition; p. 199; Section 5. Searching of Product-Ion Spectra Against Standardized Databases; p. 218-p. 220, 7 pages all together.

Japanese Rejection and Search Report in Application 2021-558569, mailed Apr. 24, 2024, 28 pages.

\* cited by examiner

METHOD FOR REAL TIME ENCODING OF SCANNING SWATH DATA AND PROBABILISTIC FRAMEWORK FOR PRECURSOR INFERENCE

RELATED APPLICATIONS

This application is a National Stage Application of PCT/IB2020/055138, filed May 29, 2020, which claims the benefit of U.S. Provisional Patent Application Ser. No. 62/855,242, filed on May 31, 2019, the entire disclosures of which are incorporated herein by reference in their entireties.

INTRODUCTION

The teachings herein relate encoding and storing scanning SWATH mass spectrometry data. More particularly the teachings herein relate to systems and methods for reducing the file size needed to store scanning SWATH data by applying real-time encoding of the scanning quadrupole dimension based on a quadrupole response function or precursor ion inference probability function.

BACKGROUND

As described below, scanning SWATH is a tandem mass spectrometry method in which a precursor ion mass selection window or precursor ion transmission window is scanned across a mass range so that successive windows have large areas of overlap and small areas of non-overlap. This scanning makes the resulting product ions a function of the scanned precursor ion transmission windows. This additional information is useful in identifying the one or more precursor ions responsible for each product ion, which is sometimes difficult to do in traditional SWATH.

One problem with scanning SWATH is that it requires the long term (e.g., file) storage of significantly more data than conventional SWATH. The increased amount of file storage is approximately proportional to the amount of precursor ion transmission window overlap. So, if n precursor ion transmission windows are overlapped in scanning SWATH, at least, approximately n times more data needs to be stored to a file in a scanning SWATH experiment than in a conventional SWATH experiment for the same precursor ion mass range analyzed.

Although file storage itself has constantly become less and less expensive, post-processing of such large files has a significant cost in terms of processing time needed and processing power required. Scanning SWATH data that is stored in files is post-processed, for example, to infer precursor ions of the measured product ions. A large number of numerical decomposition or probabilistic inference methods are available that can be applied to scanning SWATH data.

Traditionally for scanning SWATH experiments, raw mass analyzer detections (e.g., time-of-flight (TOF) mass analyzer counts) for each product ion produced from each overlapping precursor ion transmission window are stored to a file. Alternatively, an intermediate type of data can also be used. For example, each product ion spectrum for each overlapping precursor ion transmission window can be stored to a file. Unfortunately, in both methods the storage size is still, at least, approximately n times larger than the storage size required for conventional SWATH storing the same type of data, if n is the number of precursor ion transmission windows are overlapped.

As a result, additional systems and methods are needed to reduce the file size required to store scanning SWATH data without losing any information needed for post-processing of the data for information like precursor ion inference.

Tandem Mass Spectrometry and Scanning SWATH

In general, tandem mass spectrometry, or MS/MS, is a well-known technique for analyzing compounds. Tandem mass spectrometry involves ionization of one or more compounds from a sample, selection of one or more precursor ions of the one or more compounds, fragmentation of the one or more precursor ions into product ions, and mass analysis of the product ions.

Tandem mass spectrometry can provide both qualitative and quantitative information. The product ion spectrum can be used to identify a molecule of interest. The intensity of one or more product ions can be used to quantitate the amount of the compound present in a sample.

A large number of different types of experimental methods or workflows can be performed using a tandem mass spectrometer. Three broad categories of these workflows are, targeted acquisition, information dependent acquisition (IDA) or data-dependent acquisition (DDA), and data-independent acquisition (DIA).

In a targeted acquisition method, one or more transitions of a precursor ion to a product ion are predefined for a compound of interest. As a sample is being introduced into the tandem mass spectrometer, the one or more transitions are interrogated during each time period or cycle of a plurality of time periods or cycles. In other words, the mass spectrometer selects and fragments the precursor ion of each transition and performs a targeted mass analysis for the product ion of the transition. As a result, a mass spectrum is produced for each transition. Targeted acquisition methods include, but are not limited to, multiple reaction monitoring (MRM) and selected reaction monitoring (SRM).

In an IDA method, a user can specify criteria for performing targeted or untargeted mass analysis of product ions while a sample is being introduced into the tandem mass spectrometer. For example, in an IDA method a precursor ion or mass spectrometry (MS) survey scan is performed to generate a precursor ion peak list. The user can select criteria to filter the peak list for a subset of the precursor ions on the peak list. MS/MS is then performed on each precursor ion of the subset of precursor ions. A product ion spectrum is produced for each precursor ion. MS/MS is repeatedly performed on the precursor ions of the subset of precursor ions as the sample is being introduced into the tandem mass spectrometer.

In proteomics and many other sample types, however, the complexity and dynamic range of compounds are very large. This poses challenges for traditional targeted and IDA methods, requiring very high-speed MS/MS acquisition to deeply interrogate the sample in order to both identify and quantify a broad range of analytes.

As a result, DIA methods, the third broad category of tandem mass spectrometry, were developed. These DIA methods have been used to increase the reproducibility and comprehensiveness of data collection from complex samples. DIA methods can also be called non-specific fragmentation methods. In a traditional DIA method, the actions of the tandem mass spectrometer are not varied among MS/MS scans based on data acquired in a previous precursor or product ion scan. Instead a precursor ion mass range is selected. A precursor ion transmission window is then stepped across the precursor ion mass range. All precursor ions in the precursor ion transmission window are fragmented and all of the product ions of all of the precursor ions in the precursor ion transmission window are mass analyzed.

The precursor ion transmission window used to scan the mass range can be very narrow so that the likelihood of multiple precursors within the window is small. This type of DIA method is called, for example, MS/MS$^{ALL}$. In an MS/MS$^{ALL}$ method, a precursor ion transmission window of about 1 amu is scanned or stepped across an entire mass range. A product ion spectrum is produced for each 1 amu precursor mass window. A product ion spectrum for the entire precursor ion mass range is produced by combining the product ion spectra for each mass selection window. The time it takes to analyze or scan the entire mass range once is referred to as one scan cycle. Scanning a narrow precursor ion transmission window across a wide precursor ion mass range during each cycle, however, is not practical for some instruments and experiments.

As a result, a larger precursor ion transmission window, or selection window with a greater width, is stepped across the entire precursor mass range. This type of DIA method is called, for example, SWATH acquisition. In a SWATH acquisition, the precursor ion transmission window stepped across the precursor mass range in each cycle may have a width of 5-25 amu, or even larger. Like the MS/MS$^{ALL}$ method, all the precursor ions in each precursor ion transmission window are fragmented, and all of the product ions of all of the precursor ions in each mass selection window are mass analyzed. However, because a wider precursor ion transmission window is used, the cycle time can be significantly reduced in comparison to the cycle time of the MS/MS$^{ALL}$ method. Or, for liquid chromatography (LC), the accumulation time can be increased. Generally, for LC, the cycle time is defined by an LC peak. Enough points (intensities as a function of cycle time) must be obtained across an LC peak to determine its shape. When the cycle time is defined by the LC, the number of experiments or mass spectrometry scans that can be performed in a cycle defines how long each experiment or scan can accumulate ion observations. As a result, wider precursor ion transmission window can increase the accumulation time.

U.S. Pat. No. 8,809,770 describes how SWATH acquisition can be used to provide quantitative and qualitative information about the precursor ions of compounds of interest. In particular, the product ions found from fragmenting a precursor ion transmission window are compared to a database of known product ions of compounds of interest. In addition, ion traces or extracted ion chromatograms (XICs) of the product ions found from fragmenting a precursor ion transmission window are analyzed to provide quantitative and qualitative information.

However, identifying compounds of interest in a sample analyzed using SWATH acquisition, for example, can be difficult. It can be difficult because either there is no precursor ion information provided with a precursor ion transmission window to help determine the precursor ion that produces each product ion, or the precursor ion information provided is from a mass spectrometry (MS) observation that has a low sensitivity. In addition, because there is little or no specific precursor ion information provided with a precursor ion transmission window, it is also difficult to determine if a product ion is convolved with or includes contributions from multiple precursor ions within the precursor ion transmission window.

As a result, a method of scanning the precursor ion transmission windows in SWATH acquisition, called scanning SWATH, was developed. Essentially, in scanning SWATH, a precursor ion transmission window is scanned across a mass range so that successive windows have large areas of overlap and small areas of non-overlap. This scanning makes the resulting product ions a function of the scanned precursor ion transmission windows. This additional information, in turn, can be used to identify the one or more precursor ions responsible for each product ion.

Scanning SWATH has been described in International Publication No. WO 2013/171459 A2 (hereinafter "the '459 application"). In the '459 application, a precursor ion transmission window or precursor ion transmission window of 25 Da is scanned with time such that the range of the precursor ion transmission window changes with time. The timing at which product ions are detected is then correlated to the timing of the precursor ion transmission window in which their precursor ions were transmitted.

The correlation is done by first plotting the mass-to-charge ratio (m/z) of each product ion detected as a function of the precursor ion m/z values transmitted by the quadrupole mass filter. Since the precursor ion transmission window is scanned over time, the precursor ion m/z values transmitted by the quadrupole mass filter can also be thought of as times. The start and end times at which a particular product ion is detected are correlated to the start and end times at which its precursor is transmitted from the quadrupole. As a result, the start and end times of the product ion signals are used to determine the start and end times of their corresponding precursor ions.

Scanning SWATH has also been described in U.S. Pat. No. 10,068,753 (hereinafter "the '753 Patent"). The '753 Patent improves the accuracy of the correlation of product ions to their corresponding precursor ions by combining product ion spectra from successive groups of the overlapping precursor ion transmission windows. Product ion spectra from successive groups are combined by successively summing the intensities of the product ions in the product ion spectra. This summing produces a function that can have a shape that is non-constant with precursor mass. The shape describes product ion intensity as a function of precursor mass. A precursor ion is identified from the function calculated for a product ion.

It is preferred to have rectangular precursor ion transmission windows for scanning SWATH. However, another advantage of scanning SWATH is that it can equally and efficiently deal with any ion transmission function. The ion transmission function does not even have to be well known ahead of time, it could be calibrated from the data itself. In other words, although rectangular precursor ion transmission windows are preferred, a precursor ion transmission window of any shape can be used.

The '459 application and the '753 patent provide methods for identifying one or more precursor ions corresponding to a product ion in scanning SWATH data. However, the '459 application and the '753 Patent do not address reducing the file size needed to store scanning SWATH data without losing any information needed for post-processing of the data.

SUMMARY

A system, method, and computer program product are disclosed for encoding and storing tandem mass spectrometry data measured from overlapping precursor ion transmission windows, in accordance with various embodiments. The system includes an ion source device, a mass filter, a fragmentation device, a mass analyzer, and a processor.

The ion source device transforms a sample or compounds of interest from a sample into an ion beam. The mass filter receives the ion beam. The mass filter then filters the ions by moving a precursor ion transmission window with precursor ion mass-to-charge ratio (m/z) width Win overlapping steps across a precursor ion mass range of R m/z with a step size S m/z. A series of overlapping transmission windows are produced across the mass range. The mass filter transmits precursor ions within the transmission window at each overlapping step.

The fragmentation device fragments or transmits the precursor ions transmitted at each overlapping step by the mass filter. One or more resulting product ions are produced for each overlapping window of the series. The mass analyzer detects intensities or counts for each of the one or more resulting product ions for each overlapping window of the series that form mass spectrum data for each overlapping window of the series.

A processor is in communication with the ion source device, the mass filter, the fragmentation device, and the mass analyzer. Instead of storing the mass spectrum data for each overlapping window of the series in a file in a memory device, the processor performs an encoding and storing step.

The processor encodes and stores each unique product ion detected by the mass analyzer in real-time during data acquisition by performing a number of sub-steps. First, the processor identifies a first appearance overlapping window of the series with a first appearance of each unique ion. The processor then selects a group of G overlapping windows of the series immediately preceding the first appearance overlapping window so that the group spans at least the width W of the transmission window. The number of overlapping windows G in the group is calculated according to G≥W/S, for example. The width W of the transmission window spanned by the group of G overlapping windows is the precursor ion uncertainty interval, for example.

In various embodiments the precursor ion likelihood can be different across the uncertainty interval W. For simplicity, it is considered constant (or a rectangular precursor ion likelihood function, where the precursor ion likelihood function is equal to mass filter transmission function). A constant precursor ion likelihood over the uncertainty interval W results in triangular precursor ion uncertainty distribution function. However, another possible precursor ion uncertainty distribution function can be a Gaussian precursor ion uncertainty distribution function.

The processor calculates a sum of counts or intensities of each unique ion detected from each window of the G overlapping windows of the group. The processor associates the sum with a position of an overlapping window of the group. The processor shifts the group of G overlapping windows of the series selected one overlapping window forward, calculates a sum of counts or intensities of each unique ion detected from each window of the G overlapping windows of the group, associates the sum with a position of an overlapping window of the group, stores the sum and the position in the memory device, and repeats these steps until at least one overlapping window of the group no longer overlaps with the first appearance overlapping window.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
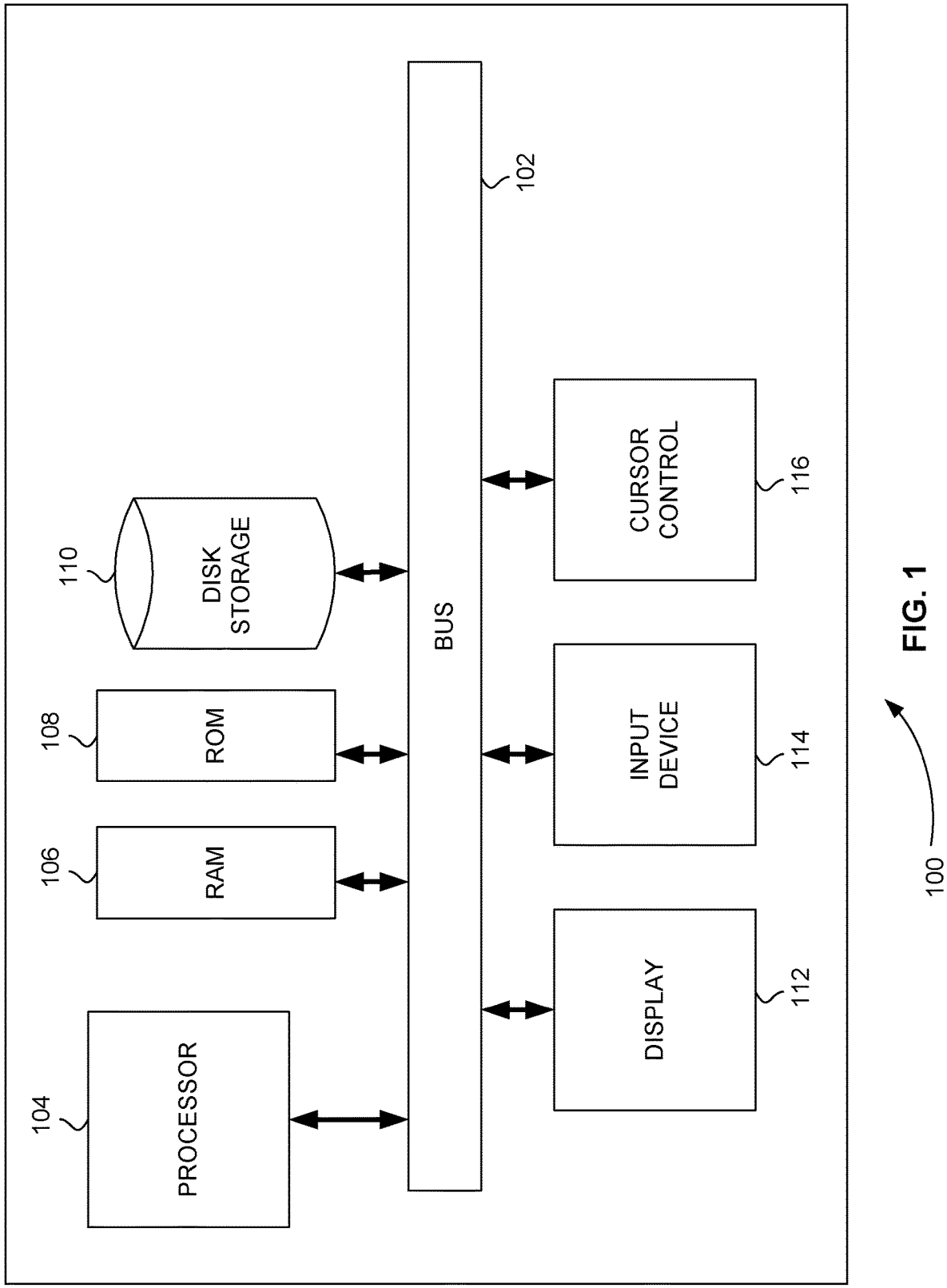
FIG. 1 is a block diagram that illustrates a computer system, upon which embodiments of the present teachings may be implemented.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random-access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings Thus, implementations of the present teachings are not limited to any specific combination of hardware circuitry and software.

The term "computer-readable medium" as used herein refers to any media that participates in providing instructions to processor 104 for execution. Such a medium may take many forms, including but not limited to, non-volatile media, volatile media, and precursor ion mass selection media. Non-volatile media includes, for example, optical or magnetic disks, such as storage device 110. Volatile media includes dynamic memory, such as memory 106. Precursor ion mass selection media includes coaxial cables, copper wire, and fiber optics, including the wires that comprise bus 102.

Common forms of computer-readable media include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Encoding and Storing Scanning Swath Data

As described above, scanning SWATH is a tandem mass spectrometry method in which a precursor ion transmission window is scanned across a mass range so that successive windows have large areas of overlap and small areas of non-overlap. One problem with scanning SWATH is that it requires the long term (e.g., file) storage of significantly more data than conventional SWATH. As a result, additional systems and methods are needed to reduce the file size required to store scanning SWATH data without losing any information needed for post-processing of the data for information like precursor ion inference.

The '459 application and the '753 patent provide methods for identifying one or more precursor ions corresponding to a product ion in scanning SWATH data. However, the '459 application and the '753 Patent do not address reducing the file size needed to store scanning SWATH data without losing any information needed for post-processing of the data.

In various embodiments, the file size needed to store scanning SWATH data is reduced by real-time encoding of the scanning quadrupole dimension based on a quadrupole response function or precursor ion inference probability function. In other words, instead of storing all of the raw detection data collected from each scan of the scanning SWATH for each product ion detected, a series of summed counts or intensities and their position is stored that describes how each product ion detected varies in the scanning quadrupole dimension or with the movement of the transmission window along the precursor ion mass range. This significantly reduces the file size needed to store scanning SWATH data without losing any information needed for post-processing of the data for information like precursor ion inference.

System for Encoding and Storing Scanning SWATH Data

Figure 2:
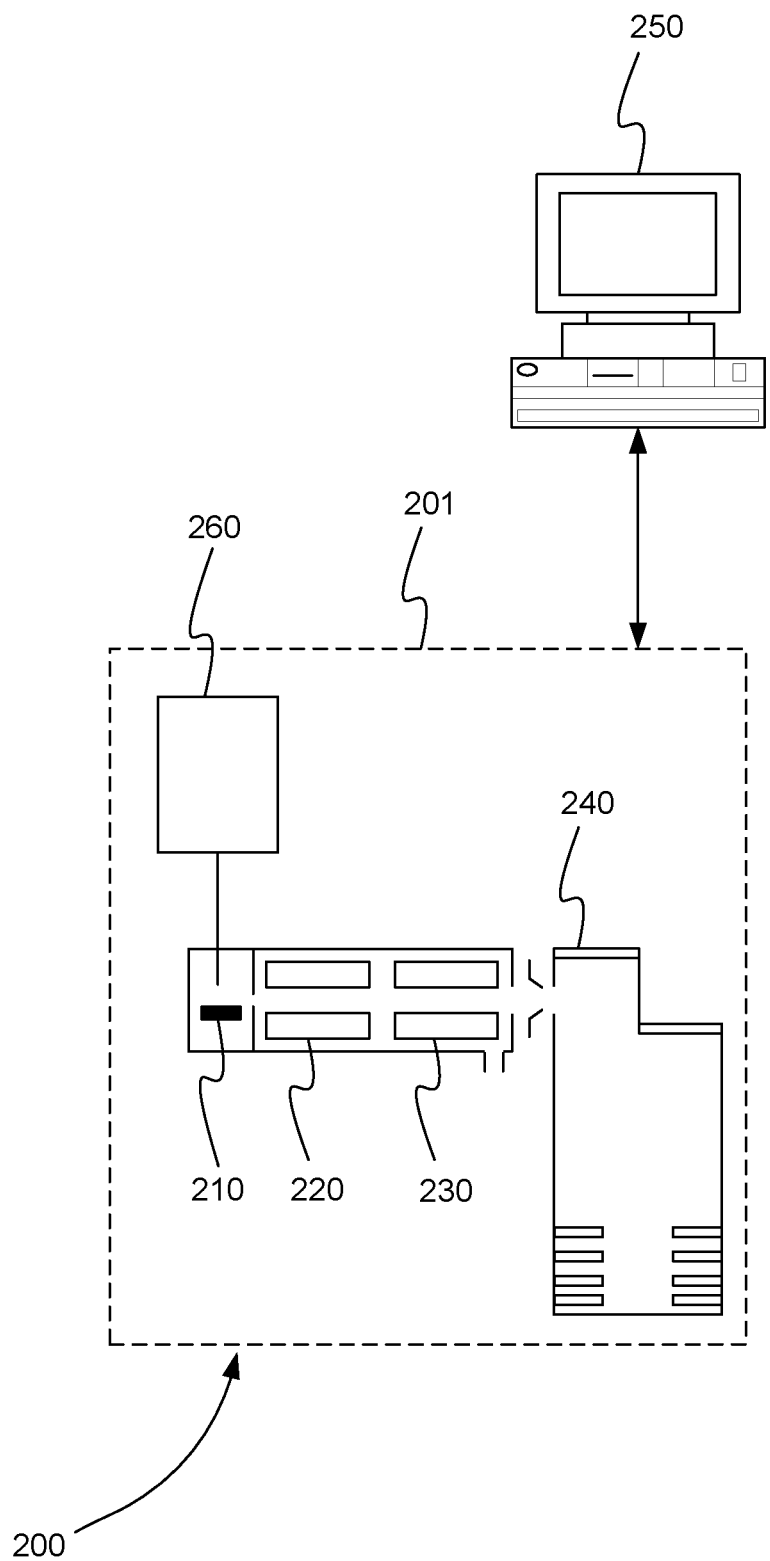
FIG. 2 is a schematic diagram showing a system for encoding and storing tandem mass spectrometry data measured from overlapping precursor ion transmission windows, in accordance with various embodiments.

FIG. 2 is a schematic diagram 200 showing a system for encoding and storing tandem mass spectrometry data measured from overlapping precursor ion transmission windows, in accordance with various embodiments. The system of FIG. 2 includes ion source device 210, mass filter 220, fragmentation device 230, mass analyzer 240, and processor 250.

In various embodiments, the system of FIG. 2 can further include sample introduction device 260. Sample introduction device 260 introduces one or more compounds of interest from a sample to ion source device 210 over time, for example. Sample introduction device 260 can perform techniques that include, but are not limited to, injection, liquid chromatography, gas chromatography, capillary electrophoresis, or ion mobility.

In the system of FIG. 2, mass filter 220 and fragmentation device 230 are shown as different stages of a quadrupole and mass analyzer 240 is shown as a time-of-flight (TOF) device. One of ordinary skill in the art can appreciate that any of these stages can include other types of mass spectrometry devices including, but not limited to, ion traps, orbitraps, ion mobility devices, or Fourier transform ion cyclotron resonance (FT-ICR) devices.

Ion source device 210 transforms a sample or compounds of interest from a sample into an ion beam. Ion source device 210 can perform ionization techniques that include, but are not limited to, matrix assisted laser desorption/ionization (MALDI) or electrospray ionization (ESI).

Mass filter 220 receives the ion beam. Mass filter 220 then filters the ions by moving a precursor ion transmission window with precursor ion mass-to-charge ratio (m/z) width W in overlapping steps across a precursor ion mass range of R m/z with a step size S m/z. A series of overlapping transmission windows are produced across the mass range. Mass filter 220 transmits precursor ions within the transmission window at each overlapping step.

Fragmentation device 230 of tandem mass spectrometer 201 fragments or transmits the precursor ions transmitted at each overlapping step by mass filter 220. One or more resulting product ions are produced for each overlapping window of the series. Fragmentation device 230 fragments the precursor ions when a collision energy high enough to fragment ions is used. Fragmentation device 230 transmits the precursor ions when a collision energy low enough not to fragment ions is used. As a result, the resulted product ions can include precursor ions.

Mass analyzer 240 of tandem mass spectrometer 201 detects intensities or counts for each of the one or more resulting product ions for each overlapping window of the series that form mass spectrum data for each overlapping window of the series. Mass analyzer 240 detects counts if it is a TOF device as shown. If mass analyzer 240 is a quadrupole, for example, it detects intensities.

Processor 250 can be, but is not limited to, a computer, a microprocessor, the computer system of FIG. 1, or any device capable of sending and receiving control signals and data from a tandem mass spectrometer and processing data. Processor 250 is in communication with ion source device 210, mass filter 220, fragmentation device 230, and mass analyzer 240. Processor 250 is shown as a separate device but can be a processor or controller of tandem mass spectrometer 201 or another device.

Instead of storing the mass spectrum data for each overlapping window of the series in a file in a memory device (not shown), processor 250 performs an encoding and storing step.

Processor 250 encodes and stores each unique product ion detected by mass analyzer 240 in real-time during data acquisition by performing a number of sub-steps. First, processor 250 identifies a first appearance overlapping window of the series with a first appearance of each unique ion.

Figure 3:
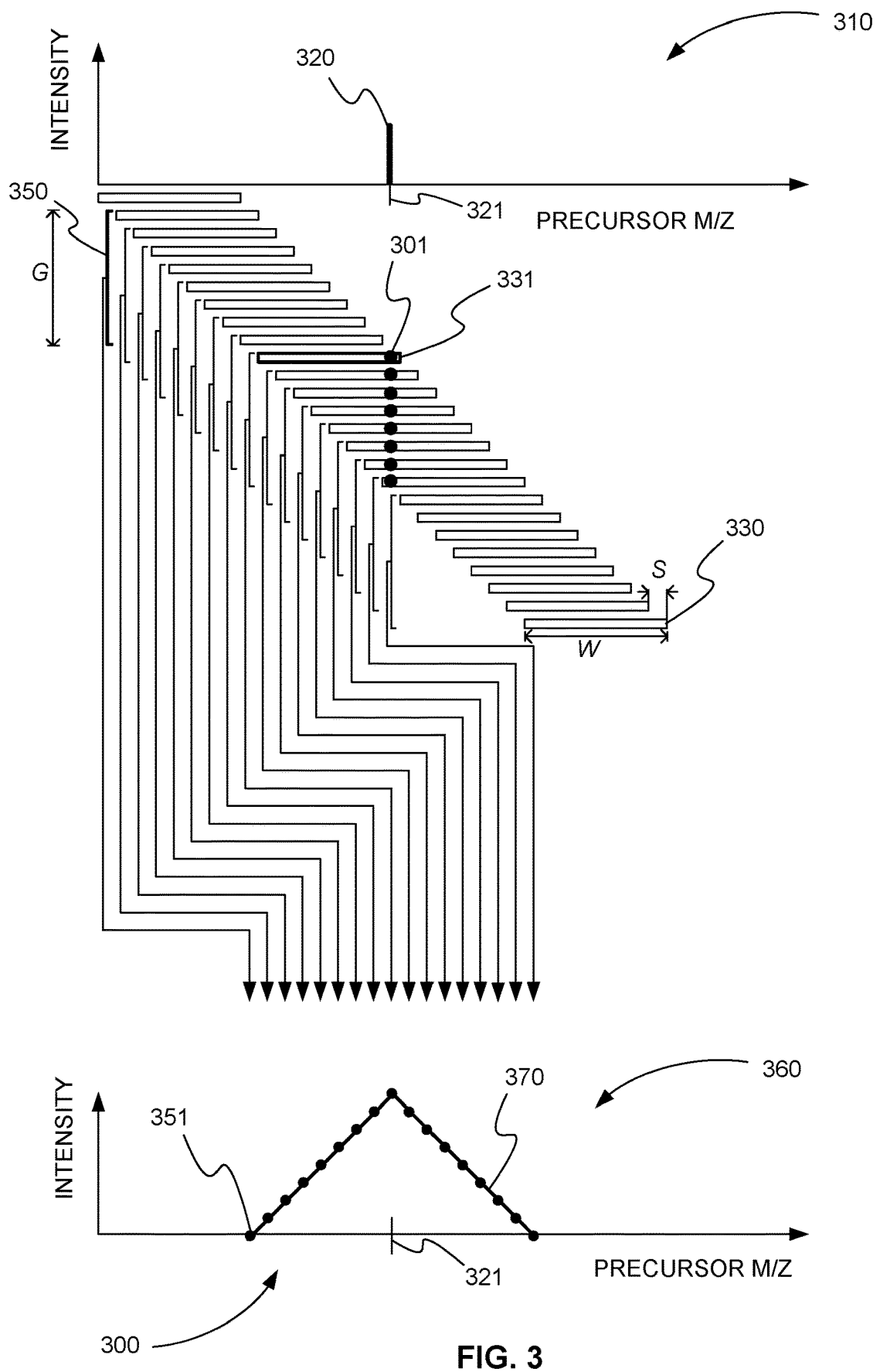
FIG. 3 is a diagram showing how each unique product ion detected is encoded in real-time during scanning SWATH data acquisition, in accordance with various embodiments.

FIG. 3 is a diagram 300 showing how each unique product ion detected is encoded in real-time during scanning SWATH data acquisition, in accordance with various embodiments. Plot 310 shows that there is a precursor ion 320 at m/z 321 within a precursor ion mass range. A precursor ion transmission window 330 with an m/z width W is stepped with a step size S m/z across the mass range, producing a series of overlapping transmission windows. In FIG. 3, a first appearance of a unique product ion 301 occurs in first appearance overlapping window 331, for example.

Returning to FIG. 2, processor 250 then selects a group of G overlapping windows of the series immediately preceding the first appearance overlapping window so that the group spans at least the width W of the transmission window. The number of overlapping windows G in the group is calculated according to G≥W/S, for example. The width W of the transmission window spanned by the group of G overlapping windows is the precursor ion uncertainty interval, for example. Processor 250 calculates a sum of counts or intensities of each unique ion detected from each window of the G overlapping windows of the group. Processor 250 associates the sum with a position of an overlapping window of the group.

In FIG. 3, for example, a group 350 of G overlapping windows of the series immediately preceding first appearance overlapping window 331 is selected so that group 350 spans at least the precursor ion uncertainty interval, which is the width W of transmission window 330. The number of overlapping windows G in group 350 is calculated according to G≥W/S and is 8, in this example. A sum of counts or intensities of unique product ion 301 detected from each window of the G overlapping windows of group 350 is calculated. The sum 351 calculated for group 350 is shown plotted in plot 360. The sum 351 is associated with the position of a first overlapping window of group 350 and is plotted at the position of the first overlapping window of group 350 in plot 360.

Returning to FIG. 2, processor 250 shifts the group of G overlapping windows of the series selected one overlapping window forward. Processor 250 calculates a sum of counts or intensities of each unique ion detected from each window of the G overlapping windows of the group. Processor 250 associates the sum with a position of an overlapping window of the group. Processor 250 stores the sum and the position in the memory device. Processor 250 repeats these steps until at least one overlapping window of the group no longer overlaps with the first appearance overlapping window.

In FIG. 3, for example, group 350 is shifted one overlapping window forward. A sum of counts or intensities of unique product ion 301 detected from each window of the G overlapping windows of group 350 is calculated. The sum is associated with a position of a first overlapping window of group 350. The sum and the position are stored in the memory device. These steps are repeated until at least one overlapping window of group 350 no longer overlaps with first appearance overlapping window 331. The sum and the position are stored in a file of the memory device, for example.

Figure 4:
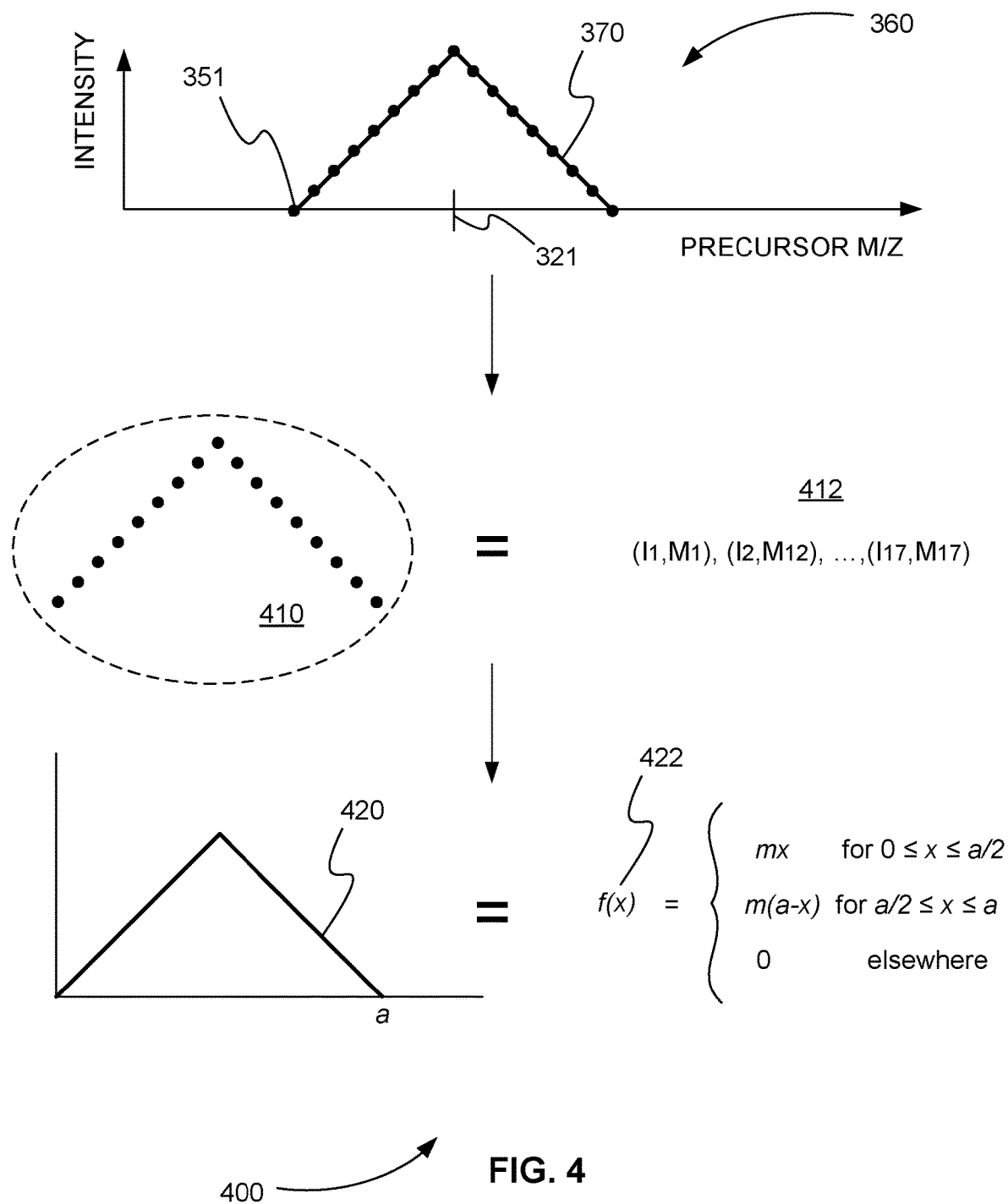
FIG. 4 is an exemplary diagram showing how a set of summed of counts or intensities for each unique ion is stored or encoded in real-time during scanning SWATH data acquisition, in accordance with various embodiments.

FIG. 4 is an exemplary diagram 400 showing how a set of summed of counts or intensities for each unique ion is stored or encoded in real-time during scanning SWATH data acquisition, in accordance with various embodiments. In FIG. 4, plot 360 of FIG. 3 is shown again. Set 410 of summed counts or intensities and their positions of the unique product ion of plot 360 is stored in a memory device. Set 410 is stored, for example, as a series 412 of intensity and position (precursor ion m/z) pairs. Since set 410 includes 17 points, series 412 includes 17 intensity and position pairs $(I_1, M_1), (I_2, M_2), \ldots, (I_{17}, M_{17})$.

A comparison of set 410 or series 412 of FIG. 4 with precursor ion transmission windows 330 of FIG. 3 shows that storing set 410 or series 412 of FIG. 4 significantly reduces the storage requirements for each product ion of scanning SWATH. Each transmission window 330 of FIG. 3 represents a product ion mass spectrum that previously had to be stored. In addition, each transmission window may include intensities of multiple product ions. FIG. 4 significantly reduces the storage requirements for storing a product ion of scanning SWATH by summing product ion intensities and only storing those intensities corresponding to the same precursor ion. In other words, the storage requirement for product ion data is significantly reduced by using an encoding that correlates intensities of product ions by precursor ion m/z.

In plot 360 of FIGS. 3-4, summed counts or intensities 351 have a triangular shape. This triangular shape is due to quadrupole mass filter 220 of FIG. 2 transmitting precursor ions with a uniform probability distribution function. Other mass spectrometers and mass filters may produce a different shape, for example. In other words, the shape of the probability distribution function is dependent on the uncertainty interval of each particular mass spectrometer. In addition, the uncertainty interval is dependent on the function of the mass filter of the tandem mass spectrometer.

An ideal tandem mass spectrometer with a mass filter that uses rectangular precursor ion transmission producing a rectangular precursor ion transmission function, in turn, produces a triangular uncertainty function, such as function 370 of plot 360 of FIGS. 3-4. Function 370 describes how summed counts or intensities of unique product ion 301 of FIG. 3 vary with the position of group 350. Returning to FIG. 4, function 370 of plot 360 can be described as function 420. In turn, mathematical function 422 can be used to describe function 420. Note that a is the length of the base of the triangle in mathematical function 422 and m is the slope or rise over run of a side of the triangle. Even more simply, function 420 may be described as a position of triangle 422 and the width, a, of its base. Again, ideally, in various embodiments, a product ion can be encoded most simply as a position and a width of a triangular function for this type of mass spectrometer.

Returning to FIG. 2, in the storing step, processor 250 stores a set of summed of counts or intensities and positions for each unique ion in a file in the memory device (not shown). In various embodiments, before or after storing the set, processor 250 reduces the number of points of the set to compress the data but still maintain the same shape of the set. Specifically, processor 250 further reduces the number of stored sums and positions of each unique ion while still maintaining the shape of the originally stored sums and positions of each unique ion in order to compress this data.

Figure 5:
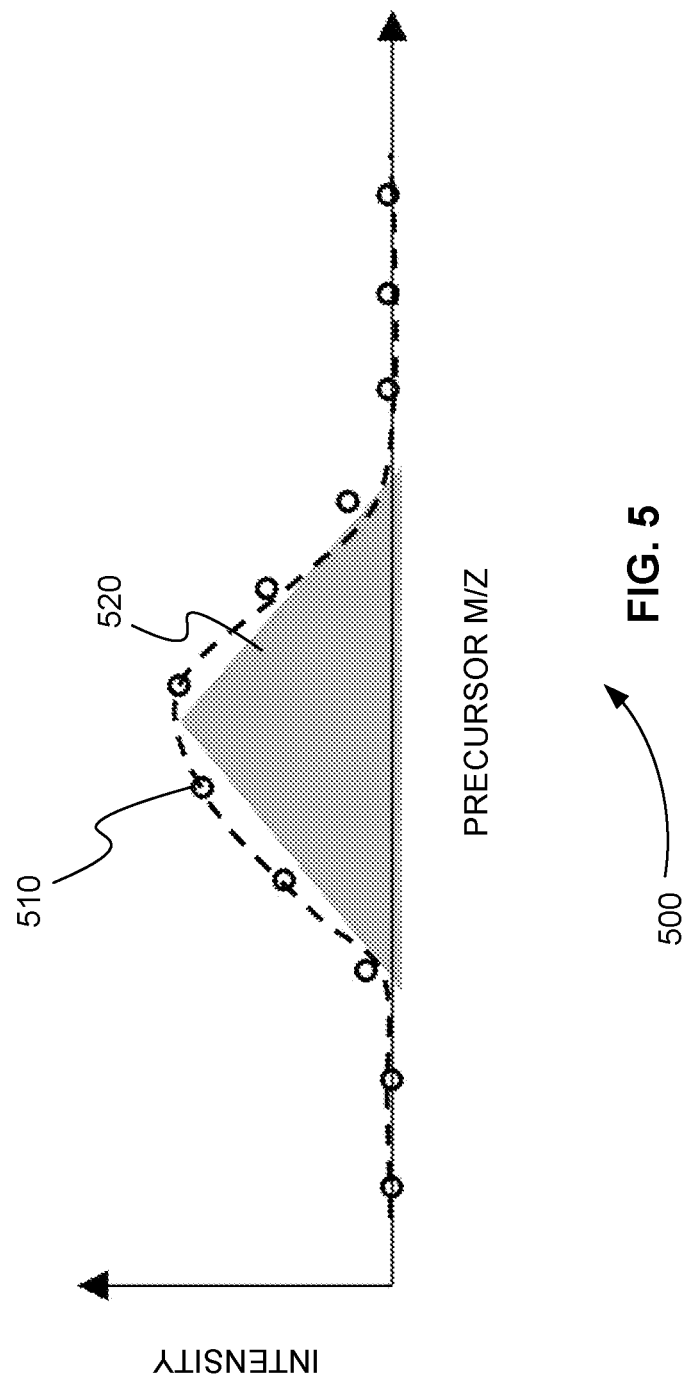
FIG. 5 is an exemplary plot showing that compressing summed counts or intensities after encoding still preserves the information necessary to infer the precursor ion, in accordance with various embodiments.

FIG. 5 is an exemplary plot 500 showing that compressing summed counts or intensities after encoding still preserves the information necessary to infer the precursor ion, in accordance with various embodiments. Points 510 represent the summed counts or intensities of a product ion remaining after a set of encoded summed counts or intensities is reduced to compress the data. Ideal triangle 520 is plotted along with points 510 to show how compressed points 510 still maintain a triangular shape. The apex of triangular shape is used, for example, to infer the precursor ion that produced the product ion.

Unfortunately, however, the encoding process can produce a blurred triangular function. This results in an elongated base and a skewed triangular shape.

In various embodiments, therefore, a deblurring algorithm is applied to the measured summed counts or intensities for a product ion to remove the effects of precursor ion uncertainty encoding Returning to FIG. 2, processor 250 further removes distortion (or uncertainty broadening) effects from the stored sums and positions of each unique ion by using a deblurring algorithm. The deblurring algorithm equates the stored sums and positions to a convolution of deblurred sums and positions and a probability distribution function that is dependent on the uncertainty interval of the scanning SWATH transmission function of the mass filter. The deblurring algorithm solves for the deblurred sums and positions of each unique ion.

In various embodiments, the deblurred sums and positions of each unique ion can be used to "sharpen" the encoded data. In other words, the deblurred sums and positions of each unique ion are written to a file in the memory device. Storing the deblurred data results in a smaller file size than writing encoded data without deblurring. It also preserves same amount of information and makes spectra and XIC extraction from such a file more accurate and less ambiguous for consecutive data analysis. Specifically, processor 250 of FIG. 2 further stores the deblurred sums and positions of the each unique in place of the stored sums and positions to reduce the space required in the memory device.

In various embodiments, the deblurred summed counts or intensities can further be encoded as a function. More specifically, in the case of a triangular function, the deblurred summed counts or intensities can further be encoded as a position and a base width of a triangle.

Deblurring algorithms are well known to those skilled in the art of image processing. Typically, in imaging, blurring is caused, for example, by camera shake. Mathematically, the camera shake can be described as a function. The measured image is then modeled as a convolution of the deblurred image and the camera shake function. A deblurring algorithm solves this equation for the deblurred image. If the blurring in an image is caused by something that cannot be modeled as a function, then a blind deconvolution algorithm can be used.

In scanning SWATH, the blurring or blurring probability distribution function is known and can be modeled. It is dependent on the precursor ion transmission function performed by the mass filter. As a result, a deblurring algorithm can be used. Of course, knowing the blurring function makes solving the "blurring problem" easier than when blurring function is not known. However, in various alternative embodiments, blind deconvolution or deblurring without knowing the blurring function can be used also.

In image processing, a deblurring algorithm is typically applied in two dimensions (the length and width of the image). In contrast and in various embodiments, in scanning SWATH, a deblurring algorithm is applied only one dimension. This is the precursor ion transmission window dimension. A deblurring algorithm is applied only one dimension, for example, to make the problem solution more stable. Any processing introduces an error. If there is no deconvolution in the time dimension, for example, then no error is introduced from all of the uncertainties surrounding that dimension. In other words, knowing the blurring function in the precursor ion transmission window dimension ensures minimized deblurring error.

Scanning SWATH can produce four-dimensional data, for example. The dependent dimension is product ion count or intensity. The three independent dimensions can include the product ion m/z dimension, the precursor ion transmission window position dimension, and the chromatographic or separation time dimension. There is generally little uncertainty in the measurement in the product ion m/z dimension.

The blurring, probability distribution function, or uncertainty in the precursor ion position in precursor dimension is not dependent on the compound being analyzed. Instead, it is dependent on the instrument or mass spectrometer and how it is used. As a result, a deblurring algorithm can be applied to this dimension.

The blurring or uncertainty in the chromatographic or separation time dimension, however, does vary with the compound being analyzed. In other words, the blurring in the chromatographic time dimension depends not only on the column used but also on the compound being analyzed. As a result, a deblurring algorithm is not applied in the chromatographic or separation time dimension.

Figure 6:
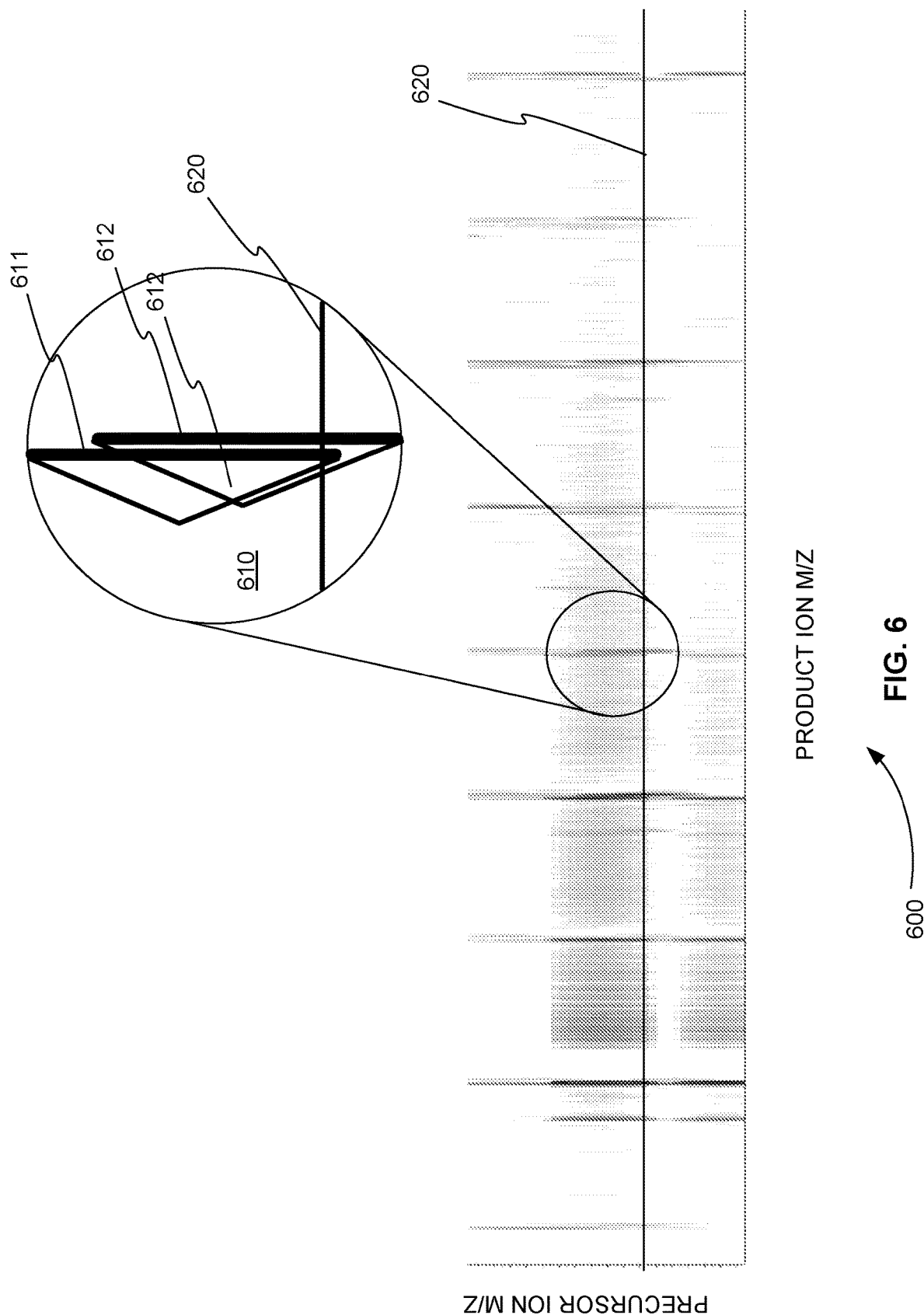
FIG. 6 is an exemplary heat map plot showing summed product ion counts plotted as a function of precursor ion transmission window position and product ion m/z before applying a deblurring algorithm to the data, in accordance with various embodiments.

FIG. 6 is an exemplary heat map plot 600 showing summed product ion counts plotted as a function of precursor ion transmission window position and product ion m/z before applying a deblurring algorithm to the data, in accordance with various embodiments. Inset 610 shows that two different product ions 611 and 612 have similar product ion m/z values. It also shows that the uncertainty interval or triangular probability distribution functions of these two product ions in the precursor ion transmission window position dimension are highly overlapped.

Typically, a product ion spectrum for a particular precursor ion transmission window position is found by drawing a horizontal line, such as line 620 through plot 600. Inset 610 shows that the spectrum of line 620 includes both product ion 611 and product ion 612. In other words, due to the large overlap in the uncertainty interval of the two product ions, both product ions would be included for the precursor ion transmission window position. Therefore, due to this large overlap or blurring, both product ions would be found as product ions of a particular precursor ion even though both may not be from the same precursor ion.

In various embodiments, a deblurring algorithm is applied to the data of FIG. 6. In particular, the Lucy-Richardson deblurring algorithm is applied in the precursor ion transmission window position dimension. The measured summed counts and their positions in the precursor ion transmission window position dimension are equated to a convolution of deblurred summed counts and positions and a triangular probability distribution function over the uncertainty interval of the mass filter. The deblurring algorithm solves this equation for the deblurred summed counts and positions. Note that some deblurring algorithms require a first derivative at every point.

Figure 7:
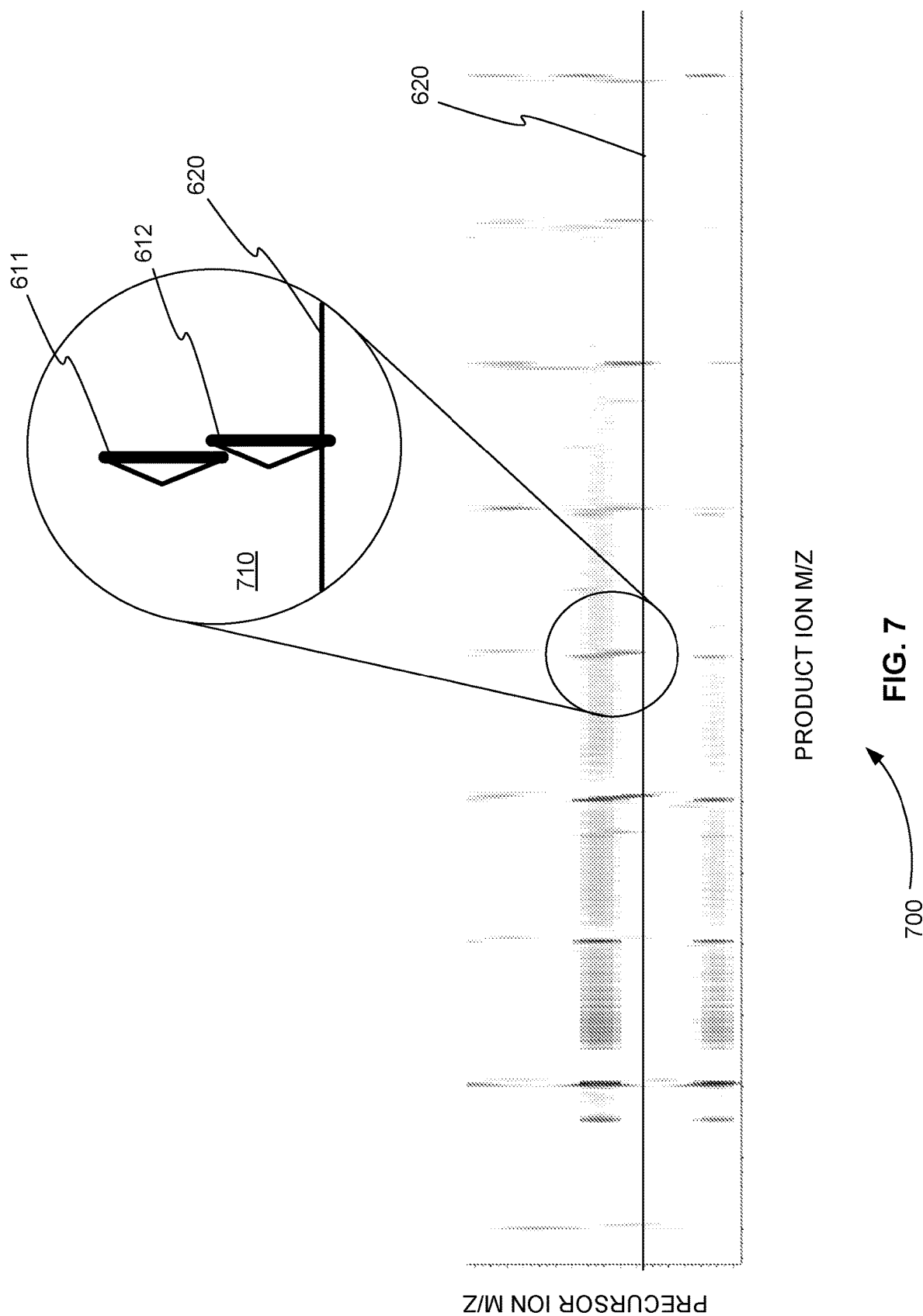
FIG. 7 is an exemplary heat map plot showing summed product ion counts plotted as a function of precursor ion transmission window position and product ion m/z after applying a deblurring algorithm to the data of FIG. 6, in accordance with various embodiments.

FIG. 7 is an exemplary heat map plot 700 showing summed product ion counts plotted as a function of precursor ion transmission window position and product ion m/z after applying a deblurring algorithm to the data of FIG. 6, in accordance with various embodiments. Inset 710 shows that two different product ions 611 and 612 still have similar product ion m/z values after deblurring. However, the uncertainty intervals or triangular probability distribution functions of these two product ions in the precursor ion transmission window position dimension show much less overlap after deblurring. Essentially, the base widths of the triangular probability distribution functions of these two product ions have been significantly reduced.

This reduction in the triangular probability distribution functions makes it easier to distinguish the product ions of precursor ions. Inset 710 shows that, after deblurring, the spectrum of line 620 no longer includes both product ion 611 and product ion 612. In other words, due to the reduction in overlap in the uncertainty interval of the two product ions, only one product ion would be included for the precursor ion transmission window position.

In various embodiments, after deblurring, the probability distribution functions in the precursor ion transmission window position dimension can be saved as an encoding for each product ion. For example, the positions and base widths of the triangles of product ion 611 and product ion 612 in FIG. 7 can be saved in the memory device instead of the measured summed counts. In other words, storing just the position and base width of a triangular function such as function 420 of FIG. 4 rather than the points of function 420 further reduces the storage requirement.

In various embodiments, the probability distribution function found after deblurring or the measured set of summed of counts or intensities for each unique product ion is read from the memory device. Either type of data is read from a file, for example. A numerical decomposition method or probabilistic inference method is then applied to the read data to determine a precursor ion of the unique product ion. For example, for a triangular function, the precursor ion of the unique product ion is found at the apex of the triangular function.

More specifically and returning to FIG. 2, in various embodiments, processor 250 further determines a precursor ion of each unique ion using the deblurred sums and positions of each unique ion. For example, the deblurred sums and positions of each unique ion have a triangular shape. Processor 250 further determines a precursor ion of each unique ion as a precursor ion corresponding to an apex of the triangular shape.

Deblurring in the precursor ion transmission window position dimension also improves peak finding in the chromatographic or separation time dimension. As described above, however, the deblurring is not applied in the chromatographic or separation time dimension.

Figure 8:
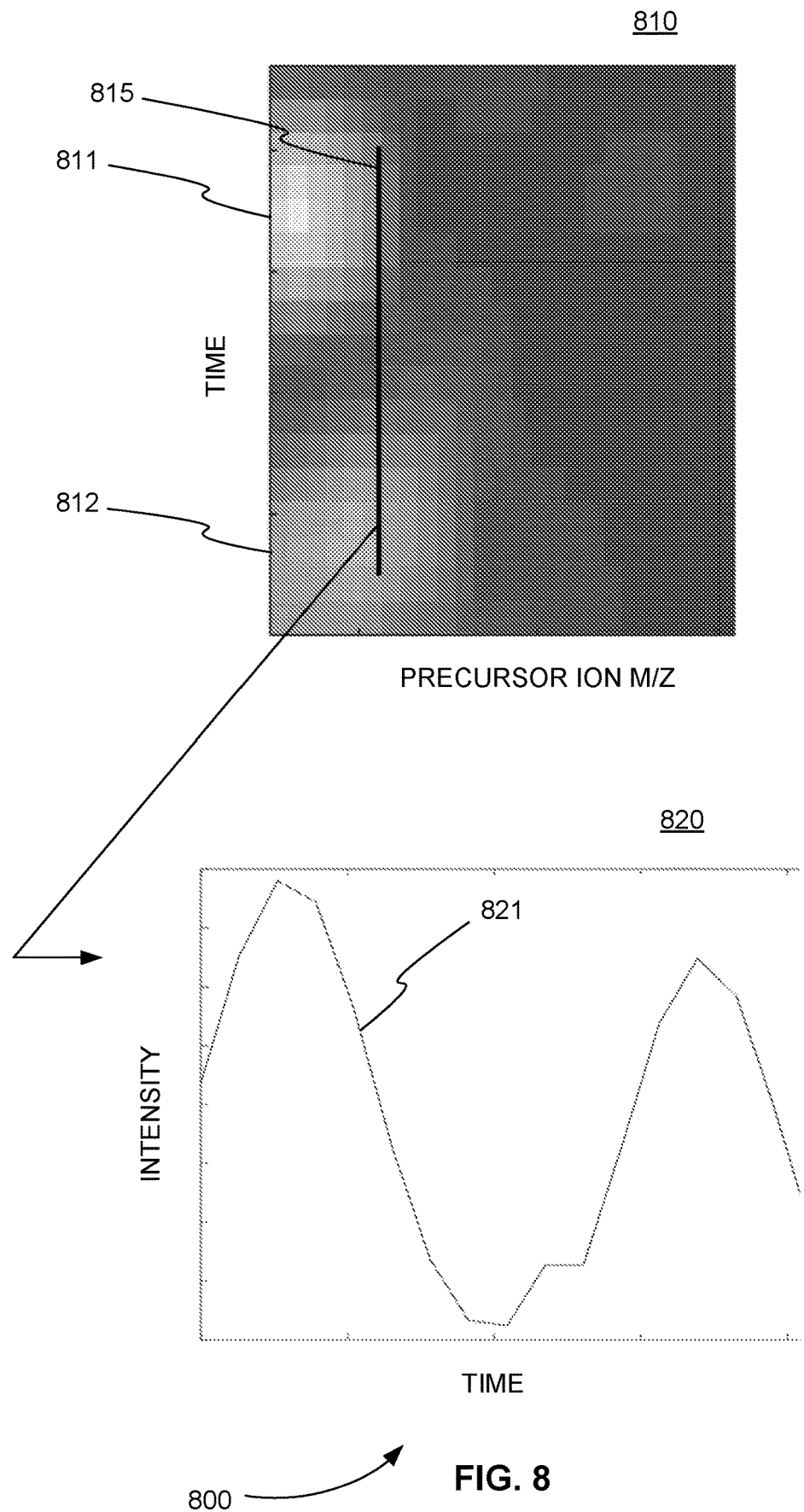
FIG. 8 is an exemplary diagram that includes a heat map plot showing summed product ion counts plotted as a function of chromatographic time and precursor ion transmission window position before applying a deblurring algorithm to the data and a plot showing an XIC found from the heat map for a precursor ion m/z value, in accordance with various embodiments.

FIG. 8 is an exemplary diagram 800 that includes a heat map plot showing summed product ion counts plotted as a function of chromatographic time and precursor ion transmission window position before applying a deblurring algorithm to the data and a plot showing an XIC found from the heat map for a precursor ion m/z value, in accordance with various embodiments. Heat map 810 shows product ion intensity regions at times 811 and 812. Before applying the deblurring algorithm, both intensity regions have a large width in the precursor ion transmission window position dimension.

As a result, for a particular precursor ion transmission window position (precursor ion m/z value) represented by line 815, both intensity regions can be detected over time. In other words, due to the large width of product ion uncertainty in the precursor ion transmission window position dimension, two different product ions can be detected over time for a particular precursor ion transmission window position.

XIC 821 is shown in plot 820. XIC 821 represents the intensities over time along line 815 of heat map 810. XIC 821 includes two separate peaks identifying two different product ions for the precursor ion transmission window position before deblurring.

Figure 9:
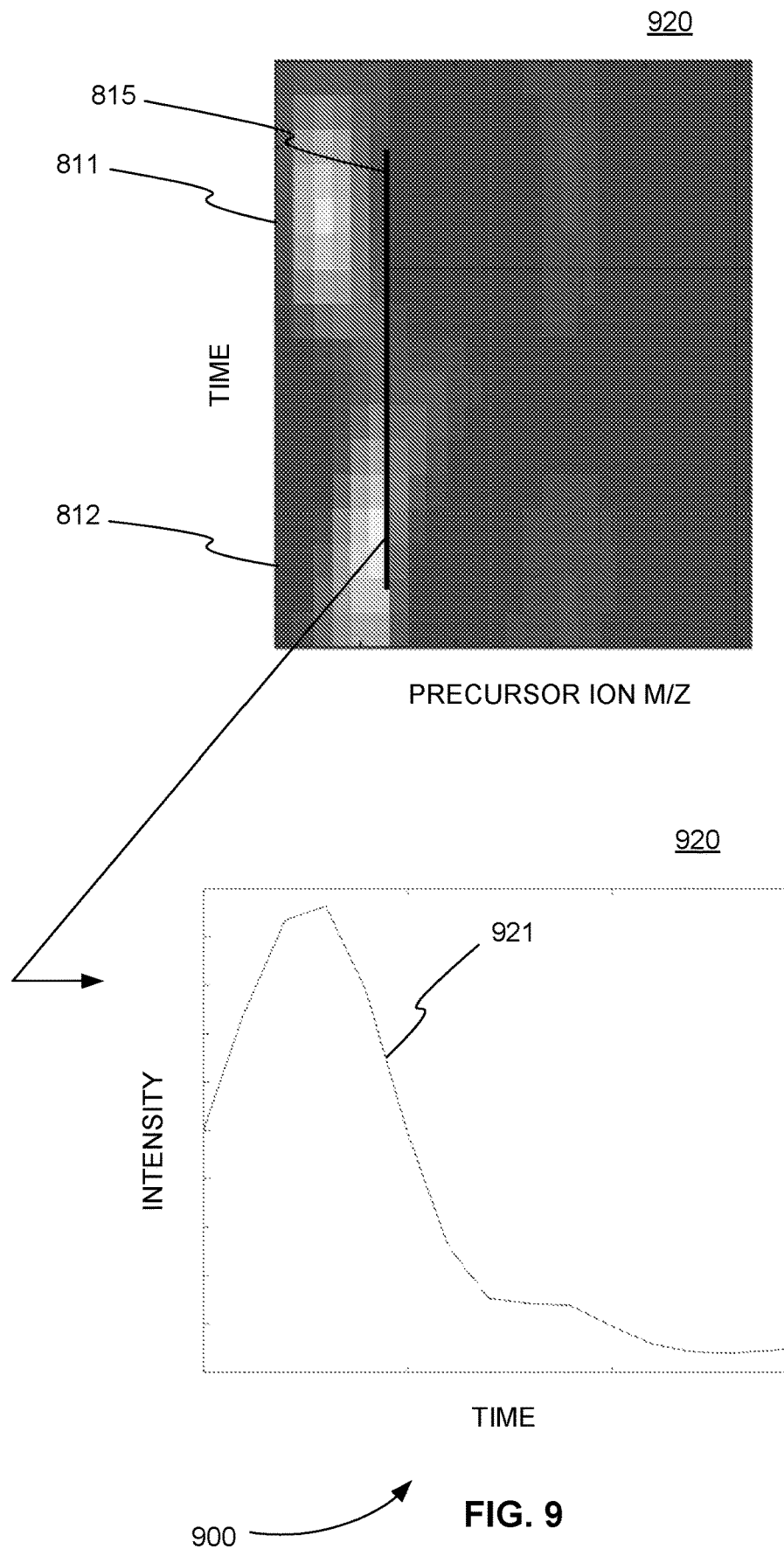
FIG. 9 is an exemplary diagram that includes a heat map plot showing summed product ion counts plotted as a function of chromatographic time and precursor ion transmission window position after applying a deblurring algorithm to the data of FIG. 8 and a plot showing an XIC found from the heat map for a precursor ion m/z value, in accordance with various embodiments.

FIG. 9 is an exemplary diagram 900 that includes a heat map plot showing summed product ion counts plotted as a function of chromatographic time and precursor ion transmission window position after applying a deblurring algorithm to the data of FIG. 8 and a plot showing an XIC found from the heat map for a precursor ion m/z value, in accordance with various embodiments. Heat map 910 again shows product ion intensity regions at times 811 and 812. After applying the deblurring algorithm, both intensity regions have a narrower width in the precursor ion transmission window position dimension than before deblurring.

Now, for a particular precursor ion transmission window position (precursor ion m/z value) represented by line 815, only one intensity region can be detected over time. In other words, due to the narrower width of product ion uncertainty in the precursor ion transmission window position dimension, only one product ion is detected over time for a particular precursor ion transmission window position.

XIC 921 is shown in plot 920. XIC 921 represents the intensities over time along line 815 of heat map 910. XIC 921 includes only one peak identifying only one product ion for the precursor ion transmission window position of line 815 after deblurring.

In various embodiments, instead of using a deblurring algorithm, a numerical method can be applied to the measured summed counts or intensities for a product ion in order to determine the precursor ion of a product ion. U.S. Pat. No. 10,651,019 (hereinafter the "'019" Patent) discloses a method for determining a precursor ion of a product ion from scanning SWATH data and is incorporated herein by reference in its entirety. In the '019 Patent, intensities of a selected product ion are retrieved from a plurality of product ion spectra obtained from each scan of a precursor ion transmission window across a precursor ion mass range. A trace is produced that describes how the intensity of the selected product ion varies with precursor ion transmission window.

A matrix multiplication equation is created that describes how one or more precursor ions correspond to the trace for the selected product ion. The matrix multiplication equation includes a known n×m mass filter matrix multiplied by an unknown precursor ion column matrix of length m that equates to a selected ion trace column matrix of length n. The matrix multiplication equation is solved for the unknown precursor ion column matrix using a numerical method, such as non-negative matrix factorization (NNMF) in general or non-negative least squares (NNLS) specifically.

In various embodiments, a set of summed counts or intensities is used for the column matrix of length n. The matrix multiplication equation is solved for the unknown precursor ion column matrix using a numerical method. As a result, the precursor ion of the product ion is found.

More specifically and returning to FIG. 2, processor 250 further determines a precursor ion of each unique ion using a numerical method. The numerical method arranges the stored sums and positions as a column matrix of length n. The numerical method equates the column matrix to a known n×m mass filter matrix for the mass filter multiplied by an unknown precursor ion column matrix of length m. Finally, the numerical method solves for the unknown precursor ion column matrix to determine the precursor ion. The numerical method can include, but is not limited to, NNMF or NNLS.

Method for Encoding and Storing Scanning SWATH Data

Figure 10:
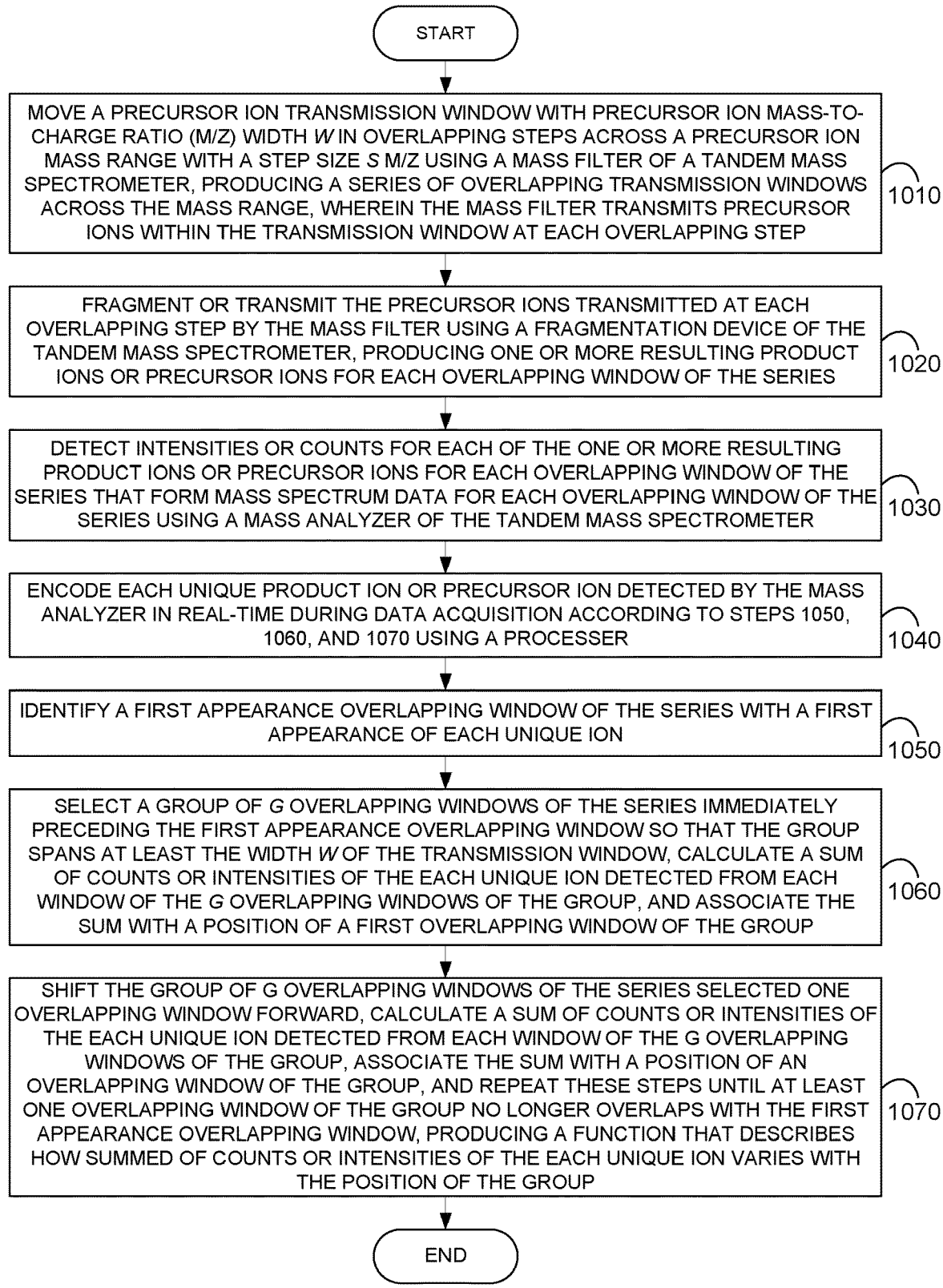
FIG. 10 is a flowchart showing a method for encoding and storing tandem mass spectrometry data measured from overlapping precursor ion transmission windows, in accordance with various embodiments.

FIG. 10 is a flowchart showing a method 1000 for encoding and storing tandem mass spectrometry data measured from overlapping precursor ion transmission windows, in accordance with various embodiments.

In step 1010 of method 1000, a precursor ion transmission window with precursor ion mass-to-charge ratio (m/z) width W is moved in overlapping steps across a precursor ion mass range with a step size S m/z using a mass filter of a tandem mass spectrometer. A series of overlapping transmission windows across the mass range are produced. The mass filter transmits precursor ions within the transmission window at each overlapping step.

In step 1020, the precursor ions transmitted at each overlapping step by the mass filter are fragmented or transmitted using a fragmentation device of the tandem mass spectrometer. One or more resulting product ions or precursor ions are produced for each overlapping window of the series.

In step 1030, intensities or counts are detected for each of the one or more resulting product ions or precursor ions for each overlapping window of the series that form mass spectrum data for each overlapping window of the series using a mass analyzer of the tandem mass spectrometer.

In step 1040, each unique product ion detected by the mass analyzer is encoded in real-time during data acquisition according to steps 1050, 1060, and 1070 using a processor.

In step 1050, a first appearance overlapping window of the series with a first appearance of each unique ion is identified.

In step 1060, a group of G overlapping windows of the series immediately preceding the first appearance overlapping window is selected so that the group spans at least the width W of the transmission window, a sum of counts or intensities of each unique ion detected from each window of the G overlapping windows of the group is calculated, and the sum is associated with a position of an overlapping window of the group.

In step 1070, the group of G overlapping windows of the series selected is shifted one overlapping window forward, a sum of counts or intensities of the unique ion detected from each window of the G overlapping windows of the group is calculated, the sum is associated with a position of an overlapping window of the group, the sum and the position are stored in the memory device, and these steps are repeated until at least one overlapping window of the group no longer overlaps with the first appearance overlapping window.

Computer Program Product for Encoding and Storing Scanning SWATH Data

In various embodiments, computer program products include a tangible computer-readable storage medium whose contents include a program with instructions being executed on a processor so as to perform a method for encoding and storing tandem mass spectrometry data measured from overlapping precursor ion transmission windows. This method is performed by a system that includes one or more distinct software modules.

Figure 11:
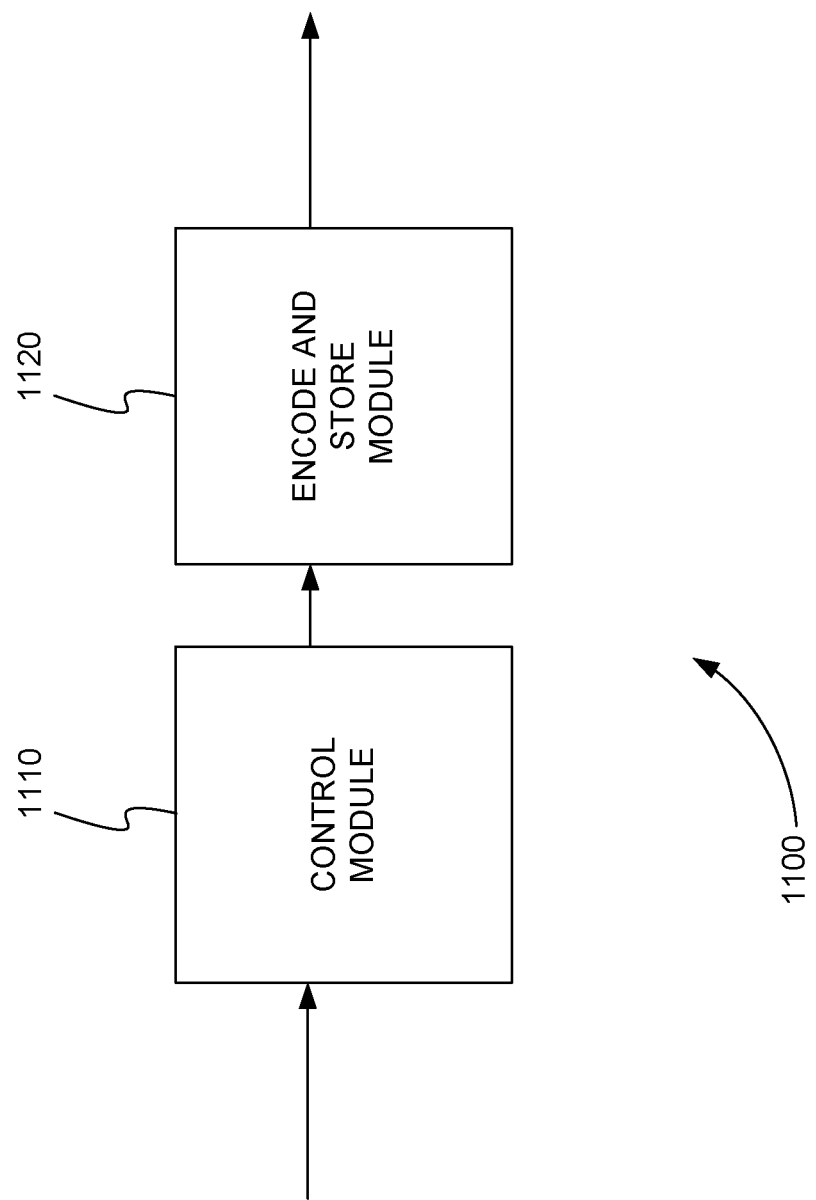
FIG. 11 is a schematic diagram of a system that includes one or more distinct software modules that perform a method for encoding and storing tandem mass spectrometry data measured from overlapping precursor ion transmission windows, in accordance with various embodiments.

FIG. 11 is a schematic diagram of a system 1100 that includes one or more distinct software modules that perform a method for encoding and storing tandem mass spectrometry data measured from overlapping precursor ion transmission windows, in accordance with various embodiments. System 1100 includes a control module 1110 and an encode and store module 1120.

Control module 1110 instructs a mass filter of a tandem mass spectrometer to move a precursor ion transmission window with precursor ion mass-to-charge ratio (m/z) width W in overlapping steps across a precursor ion mass range with a step size S m/z. A series of overlapping transmission windows across the mass range is produced. The mass filter transmits precursor ions within the transmission window at each overlapping step.

Control module 1110 instructs a fragmentation device of the tandem mass spectrometer to fragment or transmit the precursor ions transmitted at each overlapping step by the mass filter. One or more resulting product ions or precursor ions are produced for each overlapping window of the series.

Control module 1110 instructs a mass analyzer of the tandem mass spectrometer that detects intensities or counts for each of the one or more resulting product ions or precursor ions for each overlapping window of the series that form mass spectrum data for each overlapping window of the series.

Encode and store module 1120 encodes each unique product ion detected by the mass analyzer in real-time during data acquisition. A first appearance overlapping window of the series with a first appearance of each unique ion is identified. A group of G overlapping windows of the series immediately preceding the first appearance overlapping window is selected so that the group spans at least the width W of the transmission window, a sum of counts or intensities of the unique ion detected from each window of the G overlapping windows of the group is calculated, and the sum is associated with a position of an overlapping window of the group.

The group of G overlapping windows of the series selected is shifted one overlapping window forward, a sum of counts or intensities of the unique ion detected from each window of the G overlapping windows of the group is calculated, the sum is associated with a position of an overlapping window of the group, the sum and the position are stored in the memory device, and these steps are repeated until at least one overlapping window of the group no longer overlaps with the first appearance overlapping window.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for encoding and storing mass spectrum data acquired using data independent acquisition, the system comprising:
    a processor;
    a non-transitory memory in communication with the processor and storing instructions that, when executed, cause the processor to:
        obtain the mass spectrum data including counts or intensities for one or more product ions in each window of a series of transmission ion windows;
        detect a unique product ion in the mass spectrum data;
        identify one or more windows in the series in which the unique product ion appears; and
        record, for each window of the one or more windows, a position of the window and a sum of counts or intensities for a group of windows spanning the window.

2. The system of claim 1, wherein encoding the mass spectrum data occurs in real-time as the mass spectrum data is obtained.

3. The system of claim 2, wherein encoding the mass spectrum data occurs in real-time as the mass spectrum data is acquired by a mass spectrometer.

4. The system of claim 1, wherein the operation of recording, for each window of the group of windows, the sum of counts or intensities and the position includes:
    recording a position of a first window of the one or more windows;
    selecting a group of windows spanning sequentially forward beginning from the first window; and
    recording a sum of counts or intensities for the group of windows in association with the position.

5. The system of claim 4, wherein the mass spectrum data is acquired using scanning Sequential Window Acquisition of All Theoretical Mass Spectra (SWATH) and the number of windows is at least equal to the width divided by a step size.

6. The system of claim 1, wherein the one or more windows includes a first appearance window, the first appearance window being a window of the one or more windows in which the unique product ion is first identified.

7. The system of claim 6, wherein the operation of recording, for each window of the group of windows, the sum of counts or intensities and the position includes:
    recording a sum and a position for a first group preceding the first appearance window of the unique product ion;
    moving the group of windows at least one window forward; and
    recording a sum and a position for a second group including the first appearance window of the unique product ion.

8. The system of claim 7, further comprising repeating the operations of:
    moving the group of windows at least one window forward, and
    recording a sum and a position for a successive group.

9. The system of claim 8, wherein the mass spectrum data is acquired using scanning Sequential Window Acquisition of all Theoretical Mass Spectra (SWATH) and the operations of moving the group of windows at least one window forward and recording a sum and a position for a successive group are repeated until at least one window of the successive group no longer overlaps with the first appearance window.

10. A method of encoding and storing a scanning SWATH data file, the method comprising:
    encoding a scanning ion transmission window dimension of mass spectrum data, wherein the encoding includes, for a unique product ion, a position of a window in which the unique product ion appears and a sum of counts or intensities for a group of windows spanning the window in which the unique product ion appears; and
    storing the position and the sum.

11. The system of claim 10, wherein each sum and position are stored as an ordered pair.

12. The system of claim 11, wherein the instructions further cause the processor to:
    identify each ordered pair associated with the unique product ion as a set;
    determine a shape of the set; and
    reduce a number of ordered pairs in the set while maintaining the shape of the set.

13. The system of claim 11, wherein the instructions further cause the processor to deblur each sum and position before storing the ordered pair.

14. The system of claim 13, wherein the instructions further cause the processor to encode the sums as a function.

15. The system of claim 14, wherein the function is a triangular function and the encoding includes the position and a base width of the triangular function.

16. The system of claim 13, wherein each sum and position is deblurred in only an ion transmission window dimension.

17. A method for identifying a precursor ion of a product ion in a data independent acquisition mass spectrometry experiment, comprising:
    obtaining a mass spectrum data including a position of an ion transmission window in which the product ion appears and a sum of counts or intensities for the product ion for a group of ion transmission windows spanning the ion transmission window of the position;
    arranging the sums as a product ion column matrix of length m;
    obtaining a known n×m mass filter matrix; and
    solving for a precursor ion column matrix of length n to determine a precursor ion of the product ion by applying a numerical method to a matrix multiplication equation, the matrix multiplication equation including the known n×m mass filter matrix multiplied by the precursor ion column matrix and producing the product ion column matrix.

18. The method of claim 17, wherein the numerical method comprises non-negative matrix factorization (NNMF).

19. The method of claim 18, wherein the numerical method comprises non-negative least squares (NNLS).

20. The method of claim 17, wherein the known n×m mass filter matrix is determined according to movement of the ion transmission windows during the data independent acquisition mass spectrometry experiment.

* * * * *